(12) United States Patent
Kaya

(10) Patent No.: US 7,710,252 B2
(45) Date of Patent: May 4, 2010

(54) METHOD DISPLAY DEVICE, DISPLAY METHOD FOR THE SAME, AND HYBRID VEHICLE EQUIPPED THEREWITH

(75) Inventor: Yasuhiro Kaya, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 334 days.

(21) Appl. No.: 11/794,949

(22) PCT Filed: Feb. 8, 2006

(86) PCT No.: PCT/IB2006/000242

§ 371 (c)(1),
(2), (4) Date: Jul. 10, 2007

(87) PCT Pub. No.: WO2006/085193

PCT Pub. Date: Aug. 17, 2006

(65) Prior Publication Data

US 2008/0042821 A1 Feb. 21, 2008

(30) Foreign Application Priority Data

Feb. 9, 2005 (JP) ............................... 2005-033009

(51) Int. Cl.
*B60Q 1/00* (2006.01)

(52) U.S. Cl. .................... 340/459; 340/438; 340/439; 340/461

(58) Field of Classification Search ................. 340/438, 340/439, 459–462; 701/22; 180/65.265, 180/65.275
See application file for complete search history.

(56) References Cited

U.S. PATENT DOCUMENTS 5,764,139 A * 6/1998 Nojima et al. ............... 340/461
7,523,797 B2 * 4/2009 Kimura et al. ........... 180/65.25

FOREIGN PATENT DOCUMENTS

| DE | 30 28 867 A1 | 2/1982 |
| DE | 35 21 363 A1 | 1/1986 |
| DE | 197 05 452 A1 | 8/1998 |
| DE | 102 49 765 A1 | 5/2004 |
| JP | 10-090011 A | 4/1998 |
| JP | 10-129298 A | 4/1998 |
| JP | 10129298 A * | 5/1998 |
| JP | 11-208313 A | 8/1999 |
| JP | 2000-046587 A | 2/2000 |
| JP | 2003-219502 A | 7/2003 |

* cited by examiner

*Primary Examiner*—Daniel Wu
*Assistant Examiner*—Nay Tun
(74) *Attorney, Agent, or Firm*—Kenyon & Kenyon LLP

(57) ABSTRACT

A meter display device includes a display panel that can display a plurality of different types of display information on the same position. The display information includes, at the least, first display information related to a hybrid vehicle and second display information related to the hybrid vehicle. The meter display device also includes a meter control unit that performs control such that any one of the plurality of different types of display information are displayed on the display panel.

11 Claims, 9 Drawing Sheets

IN S-RANGE ⇓  ⇑ NOT IN S-RANGE

IN S-RANGE ⇓ ⇑ NOT IN S-RANGE

METHOD DISPLAY DEVICE, DISPLAY METHOD FOR THE SAME, AND HYBRID VEHICLE EQUIPPED THEREWITH

This is a 371 national phase application of PCT/IB2006/000242 filed 08 Feb. 2006, claiming priority to Japanese Patent Application No. 2005-033009 filed 09 Feb. 2005, the contents of which are incorporated herein by reference.

BACKGROUND OF THE INVENTION

1. Field of the Invention

The invention relates to a meter display device, a display method for the device, and a hybrid vehicle equipped therewith. More particularly, the invention relates to a meter display device, a display method for the device, and a hybrid vehicle equipped therewith that is used in a hybrid vehicle including an internal combustion engine and a motor that are controlled such that power from one and/or both of the engine and the motor is output to a drive shaft that rotates wheels.

2. Description of the Related Art

A meter display device that is used in a hybrid vehicle including an internal combustion engine and a motor is described, for example, in Japanese Patent Application No. JP-A-10-129298. In the hybrid vehicle, the internal combustion engine and the motor are controlled such that power from one and/or both of them is output to a drive shaft. The described meter display device displays the rotation speeds and torques of various structural elements on a display panel in accordance with the running mode. When the vehicle is being driven by the motor, the meter display device displays an input shaft rotation speed and an input shaft torque of an automatic transmission in a rotation speed display section and a torque display section of the display panel. On the other hand, when the vehicle is being driven by the engine, the device displays the engine speed and the engine torque in the rotation speed display section and the torque display section of the display panel.

With the meter display device described above, however, a relatively large display space is required since the two display sections, namely, the rotation speed and torque display sections, are arranged next to each other in the display panel.

SUMMARY OF THE INVENTION

It is an object of the invention to provide a meter display device, a display method for the device, and a hybrid vehicle equipped with the device that enable changes in a plurality of parameters related to the hybrid vehicle to be displayed in a relatively small display space.

A first aspect of the invention relates to a meter display device that includes display means and display control means. The meter display device displays a plurality of types of display information including first display information and second display information that are displayed at the same position on the display means. The display control means controls the display information displayed on the display means such that any one of the plurality of types of display information that can be displayed on the display means is displayed. The first display information may show changes in a first parameter related to the hybrid vehicle and the second display information may show changes in a second parameter related to the hybrid vehicle.

The meter display device can display any one of the plurality of types of display information, including the first and the second display information, at the same position on the display means. More specifically, the meter display device can switch from the presently displayed display information to different display information. Thus, when the plurality of display information is displayed, the plurality of the display information can be displayed in a relatively small display space as compared to when each type of display information is arranged next to each other.

In the meter display device of the invention, the display control means may control which one of the plurality of types of display information is displayed on the display means based on a switch operation that is performed by a driver or an operation condition of the hybrid vehicle. With this configuration, when the driver turns the switch, the display control means displays information corresponding to the new switch position. Alternatively, when the operation condition of the hybrid vehicle changes, the display control means displays information corresponding to the new operation condition.

In the meter display device of the invention, the first display information may be a rotation speed of the internal combustion engine, and the second display information may be any one of power that is output from the hybrid vehicle, power that is output from the internal combustion engine, or power that is output to the drive shaft. Here, the display control means may control which one of a rotation speed meter which displays the rotation speed of the internal combustion engine, and an output meter which displays any one of power that is output from the hybrid vehicle, power that is output from the internal combustion engine, or power that is output to the drive shaft is displayed on the display means. The display control means may perform control such that the rotation speed meter is displayed on the display means when a sequential shift switch is on. Also, the display control means may perform control such that the output meter is displayed on the display means when the sequential shift switch is off. With the above configuration, when the driver upshifts or downshifts when the shift lever has been placed in a range that enables sequential shifting, the driver can see changes in the engine speed of the internal combustion on the display means. Moreover, the display control means may perform control such that the rotation speed meter is displayed on the display means when the hybrid vehicle is being operated such that the engine speed of the internal combustion engine is adjusted as if a gear ratio has been changed. Further, the display control means may perform control such that the output meter is displayed on the display means when the hybrid vehicle is being operated such that the engine speed of the internal combustion engine is not adjusted as if a gear ratio has been changed. As a result, both the adjusted engine speed and the changes of the engine speed of the internal combustion engine can be displayed for the driver to see. Thus, the effectiveness of the adjustment increases. Also, the display control means may perform control such that the output meter is displayed on the display means when the internal combustion engine is stopped and power is output from the motor to the drive shaft. Thus, the output meter is displayed when it is not necessary to display the engine speed of the internal combustion engine when the internal combustion engine is stopped.

In the meter display device, the display control means may perform control such that, when switching between displaying the output meter and the rotation speed meter, the display control means electronically switches, at the least, a meter scale display of the output meter with a meter scale display of the rotation speed meter. When switching of the display is performed in this manner, the figures and letters, or their colors or pattern, may be changed. Moreover, the display control means may perform control such that, when switching between displaying the output meter and the rotation speed meter, the display control means electronically switches, at the least, a needle display of the output meter with a needle display of the rotation speed meter. In this case, the shape, color or pattern of the needle display may be changed, for example.

A second aspect of the invention relates to a meter display method including displaying first display information that shows changes in a first parameter related to the hybrid vehicle on display means: and displaying second display information that shows changes in a second parameter related to the hybrid vehicle on the display means, instead of displaying changes in the first parameter. Thus, when the plurality of types of display information are displayed, the plurality of types of display information can be displayed in a relatively small display space as compared to when the different types of display information are arranged next to each other. Note that, the method may also include any other steps that promote functioning of the meter display device according to the above described first aspect and any one of its modified forms.

A third aspect of the invention provides a hybrid vehicle that is equipped with the meter display device according to the first aspect of the invention or any one of its modified forms. Because the hybrid vehicle is equipped with the meter display device, when the plurality of types of display information are displayed, the plurality of types of display information can be displayed in a relatively small display space as compared to when the different types of display information are arranged next to each other. Furthermore, the hybrid vehicle may include electric power/power input-output means and vehicle control means. The electric power/power input-output means is connected to an output shaft of the internal combustion engine and the drive shaft and outputs at least a part of the power output from the internal combustion engine to the drive shaft based on input/output of electric power and power. The vehicle control means controls the internal combustion engine, the electric power/power input-output means and the motor based on the operation condition of the hybrid vehicle. Alternatively, the vehicle control means may control the internal combustion engine, the electric power/power input-output means and the motor based on upshifting or downshifting performed by the driver when the sequential shift switch is on such that at least the engine speed of the internal combustion engine changes. Further, the electric power/power input-output means may include three-shaft power input/output means and a generator. The three-shaft power input/output means has three shafts that are connected to three respective shafts that are the output shaft of the internal combustion engine, the drive shaft and a third rotating shaft. This three-shaft power input/output means selectively inputs/outputs power to/from any two of the three shafts, and selectively inputs/outputs power to/from the remaining shaft such that the two shafts input power when the remaining shaft outputs power or the two shafts output power when the remaining shaft inputs power. The generator inputs/outputs power to/from the third rotating shaft. Furthermore, the electric power/power input-output means may include a first rotor, a second rotor and a two-rotor motor. The first rotor is connected to the output shaft of the internal combustion engine. The second rotor is connected to the drive shaft. Also, the two-rotor motor inputs/outputs electric power generated by the electromagnetic effect of the first rotor and the second rotor, and outputs at least a part of power from the internal combustion engine to the drive shaft.

BRIEF DESCRIPTION OF THE DRAWINGS

The foregoing and/or further objects, features, and advantages of the invention will become apparent from the following description of an embodiment and its various modified forms with reference to the accompanying drawings, in which like numerals are used to represent like elements and wherein.

DETAILED DESCRIPTION OF THE EXEMPLARY EMBODIMENTS

Figure 1:
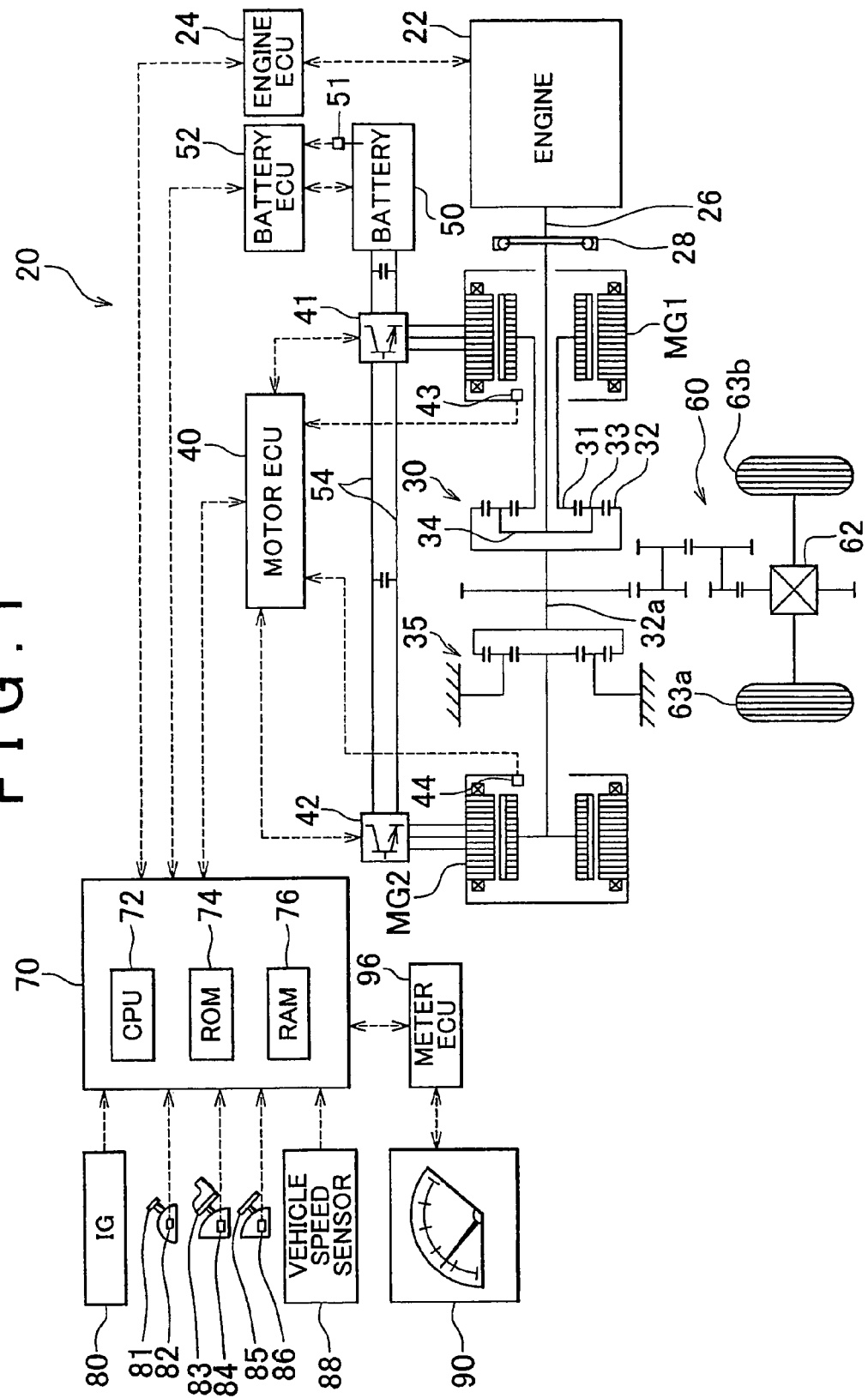
FIG. 1 is a block diagram schematically showing the structure of a hybrid vehicle.

FIG. 1 is a block diagram schematically showing the structure of a hybrid vehicle 20 according to an embodiment of the invention. The hybrid vehicle 20 of the embodiment includes, as shown in FIG. 1, an engine 22, a three-shaft power distribution/integration mechanism 30, a motor MG1, a reduction gear 35, a motor MG2, and a hybrid electronic control unit 70. The power distribution/integration mechanism 30 is connected to a crank shaft 26 that is an output shaft of the engine 22 via a dumper 28. The motor MG1 is connected to the power distribution/integration mechanism 30 and can generate electric power. The reduction gear 35 is attached to a ring gear shaft 32a that acts as a drive shaft and that is connected to the power distribution/integration mechanism 30. The motor MG2 is connected to the reduction gear 35, and the hybrid electronic control unit 70 controls the drive system of the vehicle.

The engine 22 is an internal combustion engine that outputs power by combusting a type of hydrocarbon fuel such as gasoline or light oil. The operation of the engine 22 is controlled by an engine electronic control unit (hereinafter referred to as "engine ECU") 24, which receives signals that are output from various sensors which detect the operation condition of the engine 22. The engine ECU 24 performs various operation controls including fuel injection control, ignition control, and intake air amount adjustment control. The engine ECU 24 communicates with the hybrid electronic control unit 70 and controls operation of the engine 22 based on control signals output from the hybrid electronic control unit 70. The engine ECU 24 also outputs signals for data related to the operation condition of the engine 22 to the hybrid electronic control unit 70 as necessary.

The power distribution/integration mechanism 30 is structured as a planetary gear mechanism including various rotating elements and acts as a differential mechanism. More specifically, the rotating elements of the power distribution/integration mechanism 30 are (i) a sun gear 31 which is an external gear, (ii) a ring gear 32 which is an internal gear and which is disposed coaxially with the sun gear 31, (iii) a plurality of pinion gears 33 that are meshed with both the sun gear 31 and the ring gear 32, and (iv) a carrier 34 which rotatably and revolvably supports the plurality of pinion gears 33. In the power distribution/integration mechanism 30, the crank shaft 26 of the engine 22 is connected to the carrier 34, the motor MG1 is connected to the sun gear 31 and the reduction gear 35 is connected to the ring gear 32 via the ring gear shaft 32a. When the motor MG1 is functioning as a generator, the power distribution/integration mechanism 30 distributes power of the engine 22, which is input from the carrier 34, to the sun gear 31 and the ring gear 32 in accordance with the gear ratio. On the other hand, when the motor MG1 is functioning as a motor, the power distribution integration mechanism 30 integrates (a) power of the engine 22 which is input from the carrier 34, and (b) power of the motor MG1 which is input from the sun gear 31, and then outputs the integrated power to the ring gear 32. The power that is output to the ring gear 32 is eventually output to driven wheels 63a, 63b of the vehicle from the ring gear shaft 32a, via a gear mechanism 60 and a differential gear 62.

The motor MG1 and the motor MG2 are a known type of synchronous generation motor and can both be driven as a generator or as an motor. Electric power is transferred between the motors MG1 and MG2 and a battery 50 via invertors 41, 42. An electric power line 54, which connects the invertors 41, 42 with the battery 50, includes a positive electrode bus and a negative electrode bus which are shared by the invertors 41, 42. The electric power line 54 allows electric power that is generated by the motor MG1 and the motor MG2 to be used by each other. Accordingly, the battery 50 is charged or discharged depending on whether the motors MG1 and MG2 are generating surplus electric power or require electric power. Note that if the electric power generation/requirements of the motors MG1, MG2 are balanced, the battery 50 is not charged or discharged. Both the motors MG1, MG2 are drive-controlled by a motor electronic control unit (hereinafter referred to as "motor ECU") 40. The motor ECU 40 is input with signals which are necessary for drive-control of the motors MG1, MG2. These signals include (a) rotation position signals indicating the rotation position of the rotors of the motors MG1, MG2, which are output from rotation position detection sensors 43, 44, and (b) phase current signals indicating the phase current applied to the motors MG1, MG2, which are detected by an electric current sensor, not shown. The motor ECU 40 outputs switching control signals to the invertors 41, 42. The motor ECU 40 communicates with the hybrid electronic control unit 70 and performs drive-control of the motors MG1, MG2 based on control signals output from the hybrid electronic control unit 70. The motor ECU 40 also outputs signals for data related to the operation condition of the motors MG1, MG2 to the hybrid electronic control unit 70 as necessary.

The battery 50 is controlled by a battery electronic control unit (hereinafter referred to as "battery ECU") 52. The battery ECU 52 receives signals which are necessary for controlling the battery 50. These signals include (a) an inter-terminal voltage signal indicating the voltage between terminals that is output from a voltage sensor, not shown, which is provided between the terminals of the battery 50, (b) a charge/discharge current signal output from a current sensor, not shown, which is connected to the electric power line 54 connected to an output terminal of the battery 50, and (c) a battery temperature Tb signal output from a temperature sensor 51 attached to the battery 50. The battery ECU 52 transmits signals for the data related to the condition of the battery 50 to the hybrid electronic control unit 70 as necessary. The battery ECU 52 also calculates the state-of-charge SOC of the battery 50 based on an integrated value of the charge/discharge current which is detected by the current sensor, and uses this value to control the battery 50.

Figure 7A:
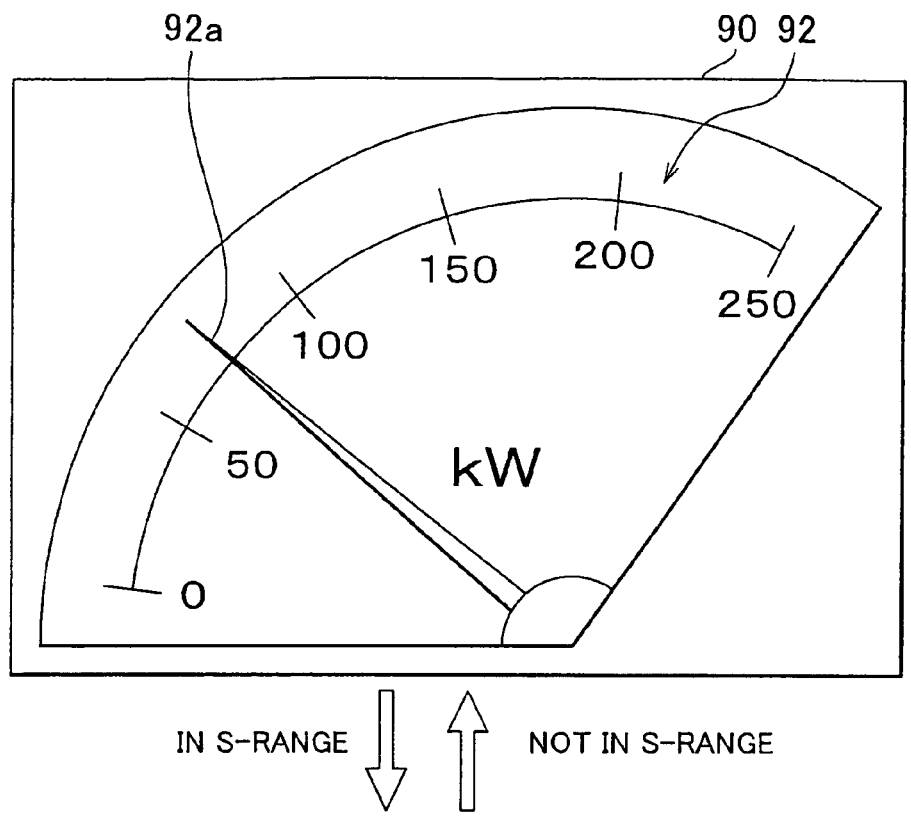
FIG. 7A is a power meter displayed in a meter display panel and FIG. 7B is a tachometer displayed in the meter display panel.
Figure 7B:
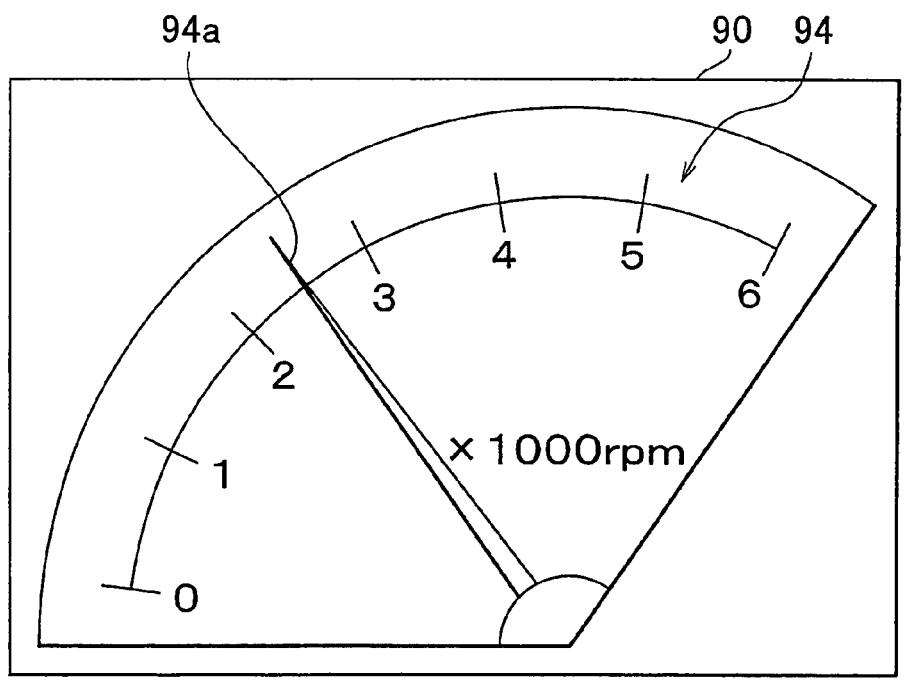

In the embodiment, a meter display panel 90 is a liquid crystal panel. The meter display panel 90 can display a power meter 92 (see FIG. 7A) and a tachometer 94 (see FIG. 7B) in the same display area such that the power meter 92 and the tachometer 94 are displayed at the same position. The power meter 92 shows changes in the power that is required from the engine 22 and the tachometer 94 shows changes in the engine speed of the engine 22. The display information of the meter display panel 90 are controlled by a meter electronic control unit (hereinafter referred to as "meter ECU) 96.

A shift lever 81 acts as an operation lever for setting any one of a plurality of know driving ranges including a Parking range, a Reverse range and a Drive range. In addition, other ranges include a regenerative braking (B) range which allows regenerative braking to be effectively performed, and a sequential shift range (hereinafter referred to as the "S-range") in which upshifting is simulated by tilting the shift lever 81 forward and in which downshifting is simulated by tilting the shift lever 81 backward.

The hybrid electronic control unit 70 is a micro processor including a CPU 72 as a main component. The hybrid electronic control unit 70 also includes a ROM 74 which stores processing programs, a RAM 76 which temporary stores data, input/output ports, not shown, and communication ports, not shown. Various signals are input to the hybrid electronic control unit 70 via the input port. These signals include (a) an ignition signal output from an ignition switch 80, (b) a shift position SP signal output from a shift position sensor 82 which detects the operation position of the shift lever 81, (c) an accelerator opening amount Acc signal output from an accelerator pedal position sensor 84 which detects the depression amount of an accelerator pedal 83, (d) a brake pedal position BP signal output from a brake pedal position sensor 86 which detects the depression amount of a brake pedal 85, and (e) a vehicle speed V signal output from a vehicle speed sensor 88. The hybrid electronic control unit 70 is connected, as will be apparent from the above description, to the engine ECU 24, the motor ECU 40, the battery ECU 52, and meter ECU 96 via the communication ports and exchanges various control signals and data signals with the engine ECU 24, the motor ECU 40, the battery ECU 52, and meter ECU 96.

In the above described hybrid vehicle 20 of the embodiment, a required torque that needs to be output to the ring gear shaft 32a serving as the drive shaft is calculated based on the accelerator opening amount Acc and the vehicle speed V. Note that, the accelerator opening amount Acc corresponds to the depression amount of the accelerator pedal 83 operated by the driver. Then, operation of the engine 22, the motor MG1 and the motor MG2 is controlled to output the required power corresponding to the required torque to the ring gear shaft 32a. Examples of this control of the engine 22, the motor MG1 and the motor MG2 include modes such as a torque conversion operation mode (1), a charge/discharge operation mode (2), and a motor operation mode (3). The torque conversion operation mode (1) is a mode in which (a) operation of the engine 22 is controlled so that power matching the required power is output from the engine 22, and in which (b) the motor MG1 and the motor MG2 are drive-controlled so that all of the power output from the engine 22 is converted to torque by the power distribution/integration mechanism 30, the motor MG1 and the motor MG2 and the required power is output to the ring gear shaft 32a. The charge/discharge operation mode (2) is a mode in which (a) operation of the engine 22 is controlled so that power matching the sum of the required power and the electric power necessary for charging or discharging the battery 50 is output from the engine 22, and in which (b) the motor MG1 and the motor MG2 are drive-controlled so that all or a part of the power, which is output from the engine 22 while the battery 50 is charged or discharged, is converted to torque by the power distribution/integration mechanism 30, the motor MG1 and the motor MG2 and the required power is output to the ring gear shaft 32a. The motor operation mode (3) is a mode in which operation is controlled such that, the engine 22 is stopped, and then power matching the power required by the motor MG2 is output to the ring gear shaft 32a.

Figure 2:
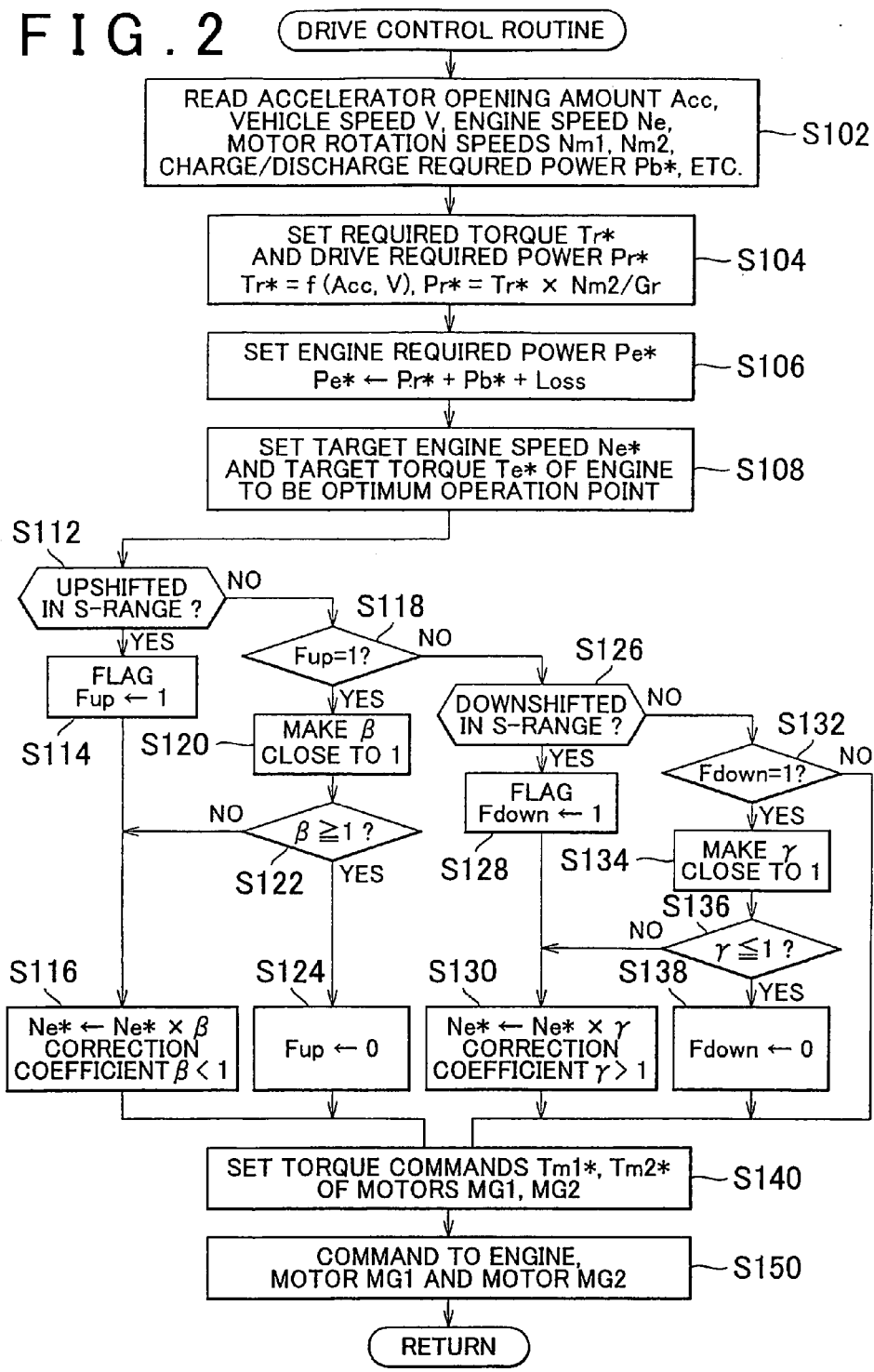
FIG. 2 is a flowchart illustrating a drive control routine.

Next, operation of the above described hybrid vehicle 20 of the embodiment will be described. More particularly, the operation when driving force is output to the ring gear shaft 32a serving as the drive shaft in accordance with the depression amount of the accelerator pedal 83 that is operated by the driver will be described. FIG. 2 is a flowchart illustrating an example of a drive control routine performed by the hybrid electronic control unit 70. The routine is continually repeated during a predetermined time period (i.e., every 8 msec).

When the drive control routine is executed, the CPU 72 of the hybrid electronic control unit 70 first executes a routine for reading the data signals necessary for control (i.e., step S102). Examples of the data signals necessary for control include the accelerator opening amount Acc output from the accelerator pedal position sensor 84, the vehicle speed V output from the vehicle speed sensor 88, engine speed Ne of the engine 22, rotation speeds Nm1, Nm2 of the motors MG1, MG2 and a charge/discharge required power Pb* of the battery 50. Note that, the rotation speeds Nm1, Nm2 of the motors MG1, MG2 are calculated based on the rotation positions of the rotors of the motors MG1, MG2 which are detected by the rotation position detection sensors 43, 44. The rotation speeds Nm1, Nm2 are obtained by the CPU 72 from the motor ECU 40. Further, the charge/discharge required power Pb* is set by the battery ECU 52 using a preset map so that power for discharging becomes larger as the state-of-charge SOC of the battery 50 increases above a reference value, and power for charging becomes larger as the state-of-charge SOC decreases below the reference value. The set charge/discharge required power Pb* is obtained by the CPU 72 from the battery ECU 52.

Figure 3:
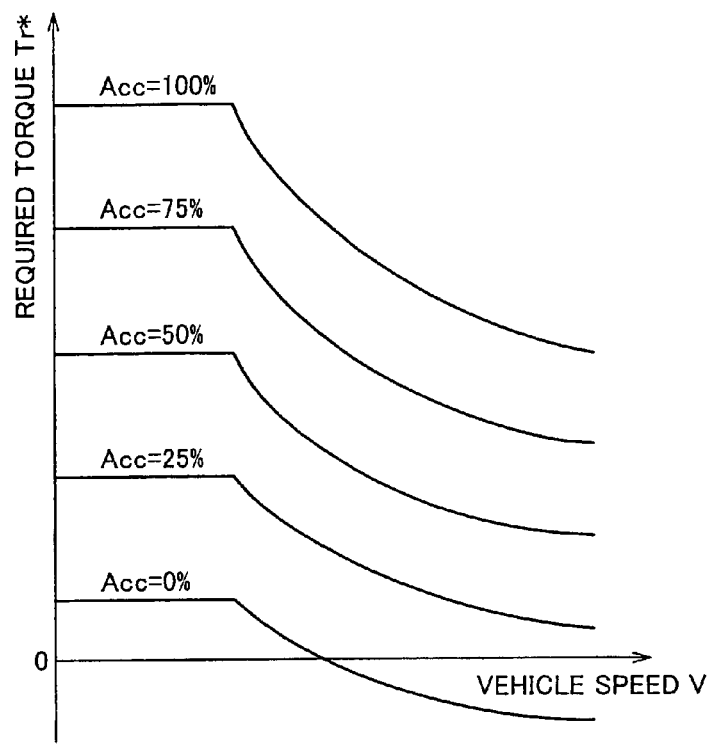
FIG. 3 is a map showing the relationship between an accelerator opening amount, a vehicle speed and a required torque.

After obtaining the data in this way, the CPU 72 sets a required torque Tr* and a drive required power Pr* (i.e., step S104). The required torque Tr* is the torque that needs to be output to the ring gear shaft 32a which serves as the drive shaft and which is connected to the driven wheels 63a, 63b as the torque that is required for the vehicle based on the accelerator opening amount Acc and the vehicle speed V. The drive required power Pr* is the power for drive which needs to be output to the ring gear shaft 32a. In this embodiment, the relationship between the accelerator opening amount Acc, the vehicle speed V and the required torque Tr* is pre-set and stored in the ROM 74 as a map for setting the required torque. Then, when the accelerator opening amount Acc and the vehicle speed V are given, the required torque Tr* is derived and set using this pre-stored map in the ROM 74. FIG. 3 is one example of a map for setting the required torque. The drive required power Pr* can be obtained by multiplying the set required torque Tr* by a rotation speed Nr of the ring gear shaft 32a. The rotation speed Nr of the ring gear shaft 32a may be obtained by multiplying the vehicle speed V by a conversion factor k, or by dividing the rotation speed Nm2 of the motor MG2 by a gear ratio Gr of the reduction gear 35.

Figure 4:
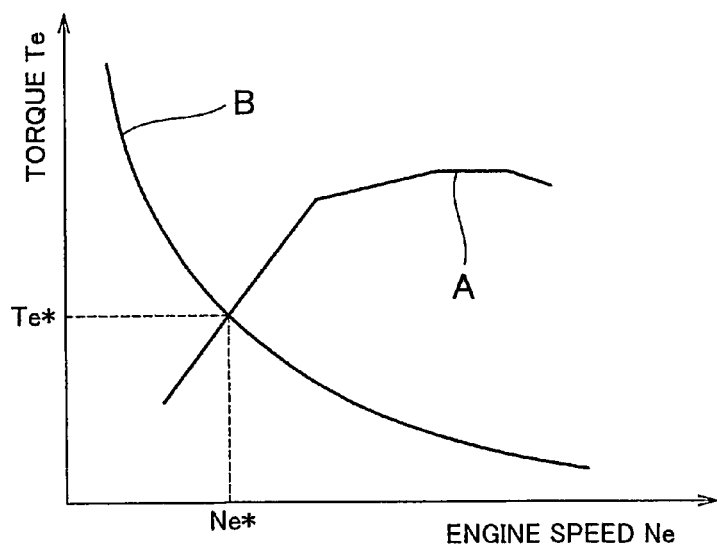
FIG. 4 is an explanatory diagram illustrating setting of an optimum operation point.

After setting the required torque Tr* and the drive required power Pr*, the CPU 72 calculates an engine required power Pe* that needs to be output from the engine 22 by adding the drive required power Pr*, the charge/discharge required power Pb* and a loss Loss (i.e., step S106). Next, the CPU 72 sets a target torque Te* and a target engine speed Ne* of the engine 22 as an optimum operation point (i.e., step S108). The optimum operation point is the point at which the engine 22 can operate in the most efficient manner among the operation points of the engine 22 at which the engine required power Pe* can be output (i.e., the point determined by the torque and engine speed). The optimum operation point is set as shown in FIG. 4. In the graph, the curve A is the engine optimum operation line, and the curve B is an equivalent power curve for the engine required power Pe*. In this case, power is expressed as product of the torque and the engine speed. Therefore, the equivalent power curve B indicates an inversely proportional relationship. As shown in the graph, when the engine 22 is operated at the optimum operation point of the intersection of the engine optimum operation line A and the equivalent power curve B of the engine required power Pe*, the engine required power Pe* can be efficiently output from the engine 22. Here, the relationship between the engine required power Pe* and the optimum operation point is previously obtained by, for example, experimentation. A map showing the experimentally derived relationship can then be stored in the ROM 74 of the hybrid electronic control unit 70. When the engine required power Pe* is given, the engine speed and torque that correspond to the optimum operation point are derived from the map, and then the target engine speed Ne* and the target torque Te* are set. Note that, although not illustrated in FIG. 2, when the engine required power Pe* is lower than a set minimum required power (i.e., a value empirically obtained while taking into consideration the point at which the efficiency of the whole system of the hybrid vehicle 20 is lowered), (i) the engine required power Pe* is set to 0, (ii) the motor MG1 is controlled so that rotation friction of the rotor of the motor MG1 becomes 0, and (iii) the MG2 is controlled so that the motor MG2 outputs all of the torque necessary for the target torque Tr* of the ring gear shaft 32a (motor operation mode).

Next, the CPU 72 of the hybrid electronic control unit 70 determines whether the driver has upshifted when the shift lever 81 is in the S-range (i.e., step S112). When upshifting has been performed, the CPU 72 sets an upshift flag Fup to 1 (i.e., step S114). Then, the CPU 72 sets a value obtained by multiplying the target engine speed Ne* of the engine 22 by a correction coefficient $\beta$ (<1) as the new target engine speed Ne* (i.e., step S116). That is, when upshifting has been performed, the CPU 72 resets the target engine speed Ne* of the engine 22 so that the target engine speed Ne* is lower than the optimum operation point. On the other hand, when upshifting has not been performed when the shift lever 81 is in the S-range in step S112, the CPU 72 determines whether or not the upshift flag Fup is 1 (i.e., step S118). When the upshift flag Fup is 1, the CPU 72 renews the correction coefficient $\beta$ by processing the correction coefficient $\beta$ using a predetermined ratio so that the correction coefficient $\beta$ becomes close to 1 (i.e., step S120). The correction coefficient $\beta$ may be processed by adding a constant value p to the correction coefficient $\beta$ so that the correction coefficient $\beta$ becomes close to 1. Alternatively, the correction coefficient $\beta$ may be processed by multiplying the correction coefficient $\beta$ with a constant value q so that the correction coefficient $\beta$ becomes close to 1. These values p, q are set such that the correction coefficient $\beta$ will exceed 1 after the processing to make the correction coefficient $\beta$ close to 1 is repeated several times using the values p, q. Next, the CPU 72 determines whether or not the renewed correction coefficient $\beta$ is 1 or more (i.e., step S122).

When the correction coefficient β is less than 1, the CPU 72 sets the value obtained by multiplying the target engine speed Ne* of the engine 22 with the correction coefficient β as the new target engine speed Ne* (i.e., step S116). When the correction coefficient β is 1 or more, the CPU 72 does not correct the target engine speed Ne* and resets the upshift flag Fup to 0 (i.e., step S124). Accordingly, when upshifting has been performed when the shift lever 81 is in the S-range, the CPU 72 resets the target engine speed Ne* of the engine 22 so that the target engine speed Ne* is lower than the optimum operation point. After that, the CPU 72 sets the target engine speed Ne* so that it gradually becomes close to the engine speed of the optimum operation point. Therefore, even though the gear ratio is not actually changed, the driver attains the same sensation as when upshifting actually takes place as a result of manipulating and adjusting the engine speed of the engine 22 as if the gear ratio has been changed to the upshift side (hereinafter, this control is referred to as "engine speed manipulation-adjustment control").

Moreover, when the upshift flag Fup is 0 in step S118, the CPU 72 determines whether the driver has downshifted when the shift lever 81 is in the S-range (i.e., step S126). When downshifting has been performed, the CPU 72 sets a downshift flag Fdown to 1 (i.e., step S128). Then, the CPU 72 sets a value obtained by multiplying the target engine speed Ne* of the engine 22 by a correction coefficient γ (>1) as the new target engine speed Ne* (i.e., step S130). That is, when downshifting has been performed, the CPU 72 resets the target engine speed Ne* of the engine 22 so that the target engine speed Ne* is higher than the optimum operation point. On the other hand, when downshifting has not performed when the shift lever 81 is in the S-range in step S126, the CPU 72 determines whether or not the downshift flag Fdown is 1 (i.e., step S132). When the downshift flag Fdown is 1, the CPU 72 renews the correction coefficient γ by processing the correction coefficient γ using a predetermined ratio so that the correction coefficient γ becomes close to 1 (i.e., step S134). The correction coefficient γ may be processed by deducting a constant value r from the correction coefficient γ so that the correction coefficient γ becomes close to 1. Alternatively, the correction coefficient γ may be processed by multiplying the correction coefficient γ with a constant value s so that the correction coefficient γ becomes close to 1. These values r, s are set such that the correction coefficient γ will be 1 or less after the processing to make the correction coefficient γ close to 1 is repeated several times using the values r, s. Next, the CPU 72 determines whether or not the renewed correction coefficient γ is 1 or less (i.e., step S136). When the correction coefficient γ is more than 1, the CPU 72 sets the value obtained by multiplying the target engine speed Ne* of the engine 22 with the correction coefficient γ as the new target engine speed Ne* (i.e., step S130). When the correction coefficient γ is 1 or less, the CPU 72 does not correct the target engine speed Ne* and resets the downshift flag Fdown to 0 (i.e., step S138). Accordingly, when downshifting has been performed when the shift lever 81 is in the S-range, the CPU 72 resets the target engine speed Ne* of the engine 22 so that the target engine speed Ne* is higher than the optimum operation point. After that, the CPU 72 sets the target engine speed Ne* so that it gradually becomes close to the engine speed of the optimum operation point. Therefore, even though the gear ratio is not actually changed, the driver attains the same sensation as when downshifting actually takes place as a result of manipulating and adjusting the engine speed of the engine 22 as if the gear ratio has been changed to the downshift side.

Figure 5:
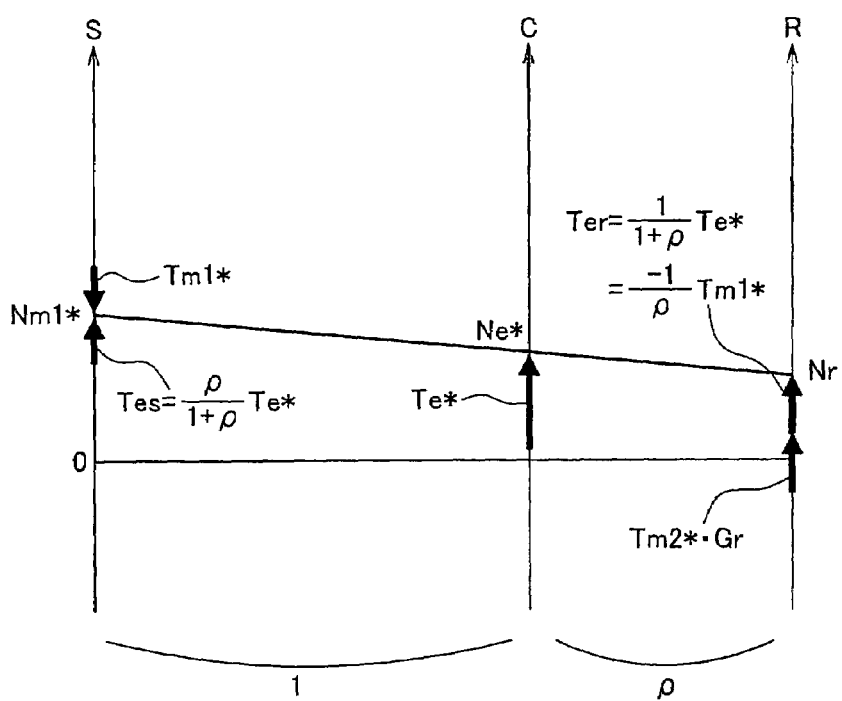
FIG. 5 is a typical operation alignment graph.

After completing either one of steps of S116, S124, S130 or S138, the CPU 72 sets torque commands Tm1*, Tm2* for the motors MG1, MG2 (i.e., step S140). More specifically, the CPU 72 calculates a target rotation speed Nm1* of the motor MG1 from the following expression (1) based on the target engines speed Ne*, the rotation speed Nr (Nm2/Gr) of the ring gear shaft 32a and a gear ratio ρ of the power distribution/integration mechanism 30. Then, based on the calculated target rotation speed Nm1* and the current rotation speed Nm1, the CPU 72 calculates the torque command Tm1* of the motor MG1 from the expression (2). Here, expression (1) indicates the dynamic relationship of the rotating elements of the power distribution/integration mechanism 30. FIG. 5 is an alignment graph showing the dynamic relationship between the rotation speeds and torques of the rotating elements of the power distribution/integration mechanism 30. Expression (1) is easily obtained using the alignment graph. The two bold arrows on the R axis represent a torque Ter and a torque Tm2*·Gr. The torque Ter is the part of the torque Te* that is output from the engine 22 and that is transmitted to the ring gear shaft 32a when the engine 22 is normally driven at the operation point of the target engine speed Ne* and the target torque Te*. The torque Tm2*·Gr is the part of the torque Tm2* that is output from the motor MG2 and that acts on the ring gear shaft 32a via the reduction gear 35. Expression (2) is an expression that indicates a relationship used in feed back control for causing the motor MG1 to rotate at the target rotation speed Nm1*. "k1" in the $2^{nd}$ term on the right side of the expression (2) is a proportional term gain, and "k2" in the $3^{rd}$ term on the right side is an integral term gain.

$$Nm1^* = Ne^* \cdot (1+\rho)/\rho - Nm2/(Gr \cdot \rho) \quad (1)$$

$$Tm1^* = \text{Previous } Tm1^* + k1(Nm1^* - Nm1) + k2\int(Nm1^* - Nm1)dt \quad (2)$$

After calculating the target rotation speed Nm1* and the torque command Tm1* of the motor MG1, the CPU 72 calculates a torque limit Tmax that is the maximum torque that can be output from the motor MG2 from the following expression (3). In expression (3), the deviation is obtained of (i) an output limit Wout of the battery 50 and (ii) the consumed electric power (generated electric power) of the motor MG1 obtained by multiplying the torque command Tm1* of the motor MG1 by the current rotation speed Nm1 of the motor MG1, and this deviation is then divided by the rotation speed Nm2 of the motor MG2. The CPU 72 also calculates a temporary motor torque Tm2tmp that needs to be output from the motor MG2 using the following expression (4) by using the target torque Tr*, the torque command Tm1*, and the gear ratio ρ of the power distribution/integration mechanism 30. The CPU 72 compares the torque limit Tmax and the temporary motor torque Tm2tmp and sets the smaller one as the torque command Tm2* of the motor MG2. By setting the torque command Tm2* of the motor MG2 in this way, the CPU 72 can set the target torque Tr* that is output to the ring gear shaft 32a serving as the drive shaft such that the torque is limited to within the output range of the battery 50. Note that expression (4) can be easily derived from the alignment graph in FIG. 5 described above.

$$Tmax = (Wout - Tm1^* \cdot Nm1)/Nm2 \quad (3)$$

$$Tm2tmp = (Tr^* + Tm1^*/\rho)/Gr \quad (4)$$

After setting the target engine speed Ne* and the target torque Te* of the engine 22, the torque command Tm1* of the motor MG1, and the torque command Tm2* of the motor MG2 in this way, the CPU 72 transmits the target engine speed Ne* and the target torque Te* of the engine 22 to the engine ECU 24. The CPU 72 also transmits the torque commands Tm1*, Tm2* of the motors MG1, MG2 to the motor ECU 40 (i.e., step S150) and ends the routine. After receiving the target engine speed Ne* and the target torque Te*, the engine ECU 24 performs various controls such as fuel injection control and ignition control so that the engine 22 is operated at the operation point determined by the target engine speed Ne* and the target torque Te*. Also, the motor ECU 40 that has received the torque commands Tm1*, Tm2* performs switching control of switching devices of the inverters 41, 42 so that the motor MG1 is driven based on the torque command Tm1* and the motor MG2 is driven based on the torque command Tm2*.

Figure 6:
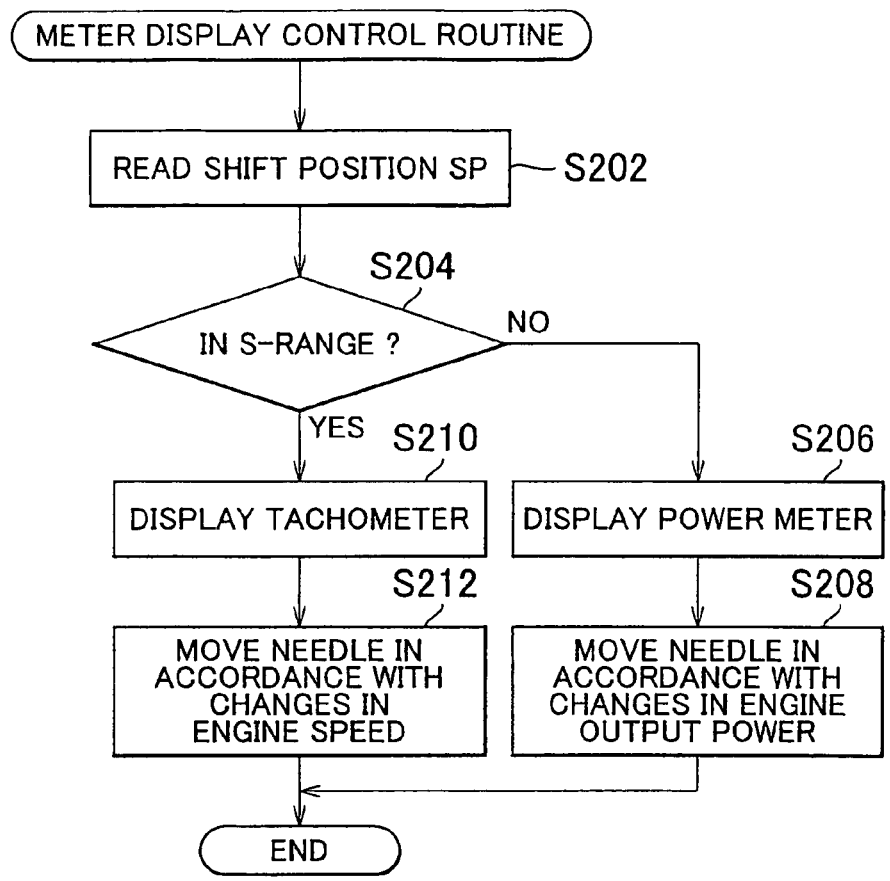
FIG. 6 is a flowchart illustrating a meter display control routine.

Next, a meter display control routine that is performed by the meter ECU 96 of the hybrid vehicle 20 will be described. FIG. 6 is a flowchart illustrating an example of the meter display control routine. The routine is continually repeated during a predetermined time period (i.e., every 8 msec).

When the meter display control routine is executed, the meter ECU 96 first executes a routine for reading the shift position SP from the shift position sensor 82 which detects the operation position of the shift lever 81 (i.e., step S202). Here, the shift position SP is obtained from the hybrid electronic control unit 70. Next, the meter ECU 96 determines whether the shift position SP is in the S-range, that is, in the sequential shift range (i.e., step S204). When the shift position SP is not in the S-range, the meter ECU 96 displays the power meter 92 (see FIG. 7A) that shows changes of an engine output power Pe output from the engine 22 in the meter display panel 90 (i.e., step S206) since the drive control routine executed by the hybrid electronic control unit 70 is being performed in accordance with the engine required power Pe* as described above. The meter ECU 96 then controls the display on the meter display panel 90 such that the current value of the engine output power Pe that is obtained by the meter ECU 96 is pointed to by a needle 92a of the power meter 92 (i.e., step S208), and then ends the routine. Note that, the engine output power Pe may be regarded as having the same value as the engine required power Pe*, and thus the engine required power Pe* output from the hybrid electronic control unit 70 may be displayed as the engine output power Pe.

On the other hand, when the shift position SP is in the S-range in step S204, the meter ECU 96 displays the tachometer 94 that shows changes of the engine speed of the engine 22 in the meter display panel 90 (i.e., step S210) since the manipulation-adjustment control of the engine speed of the engine 22 is being performed as described above. In the manipulation-adjustment control, the engine speed of the engine 22 is temporarily lowered as if the gear ratio is actually changed toward the upshift side when upshifting is performed. On the other hand, when downshifting, the engine speed of the engine 22 is temporarily increased as if the gear ratio is actually changed toward the downshift side. The meter ECU 96 then controls the meter display panel 90 such that the current value of the engine speed of the engine 22 that is obtained by the meter ECU 96 is pointed to by a needle 94a of the tachometer 94 (i.e., step S212), and then ends the routine. Note that, a value that is calculated based on a value detected by a crank angle sensor, not shown, that is attached to the crank shaft 26 may be displayed as the engine speed of the engine 22. Alternatively, the engine speed may be regarded as having the same value as the target engine speed Ne*, and thus the target engine speed Ne* from the hybrid electronic control unit 70 may be displayed as the engine speed of the engine 22.

Next, the relationship between the components of the embodiment and the elements of the invention will be clarified. The meter display panel 90 of the embodiment corresponds to display means of the invention, and the meter ECU 96 corresponds to display control means. Further, the crank shaft 26 corresponds to an output shaft, the ring gear shaft 32a corresponds to a drive shaft, the motor MG2 corresponds to a motor, the hybrid electronic control unit 70 corresponds to vehicle control means, the motor MG1 and the power distribution/integration mechanism 30 correspond to electric power/power input-output means, the motor MG1 corresponds to a motor, and the power distribution/integration mechanism 30 corresponds to power input-output means. Note that, in this embodiment, the operation of the meter ECU 96 of the hybrid vehicle 20 will be described in order to clarify an example of a meter display method of the invention.

According to the embodiment described above, the power meter 92 and the tachometer 94 can be displayed in relatively small area as compared to when both the power meter 92 and the tachometer 94 are displayed next to each other. Also, just one of the power meter 92 and the tachometer 94 is displayed in the meter display panel 90 depending on the shift position SP in which the driver has placed the shift lever 81. Therefore, when the drive changes the shift lever 81 from another range to the S-range or from the S-range to another range, the information that is displayed on the meter display panel 90 corresponds to the shift position SP after shifting is completed. Moreover, in the hybrid vehicle 20, even when the shift lever 81 is upshifted or downshifted in the S-range, the gear ratio of the transmission is not actually changed, but the engine speed of the engine 22 is manipulated and adjusted as if the gear ratio has been changed. Since the tachometer 94 is displayed when the driver places the shift lever 81 in the S-range, he or she can see this manipulated/adjusted engine speed of the engine 22 in the display area. Thus, the driver can obtain a sense of the gear change through his/her eyes.

The invention is not limited to the foregoing embodiment and may be embodied in various other forms within the technical scope of the invention.

In the foregoing embodiment, for example, just one of the power meter 92 and the tachometer 94 is displayed in the meter display panel 90 depending on whether it is determined that the shift lever 81 is in the S-range or not. Alternatively, however, a sequential shift switch may be provided. This shift switch is turned ON when the shift lever 81 is in the S-range, and turned OFF when the shift lever 81 is in ranges other than the S-range. The meter ECU 96 may display the power meter 92 in the meter display panel 90 when the sequential shift switch is OFF, and display the tachometer 94 in the meter display panel 90 when the sequential shift switch is ON. Further, in the hybrid vehicle 20 of the foregoing embodiment, even though upshifting or downshifting is performed when the shift lever 81 is in the S-range, the gear ratio of the transmission is not actually changed, but the engine speed of the engine 22 is manipulated and adjusted as if the gear ratio has been changed. Accordingly, instead of determining whether the shift lever 81 is in the S-range as in the above embodiment, the meter ECU 96 may determine whether the operation condition of the engine 22 is one in which the engine speed is being manipulated and adjusted. The meter ECU 96, may then display either the power meter 92 or the tachometer 94 in the meter display panel 90 based on the result. Further, in the motor operation mode, the meter ECU 96 may display the power meter 92 in the meter display panel 90 since there is no point in displaying changes in the engine speed of the engine 22.

Figure 8A:
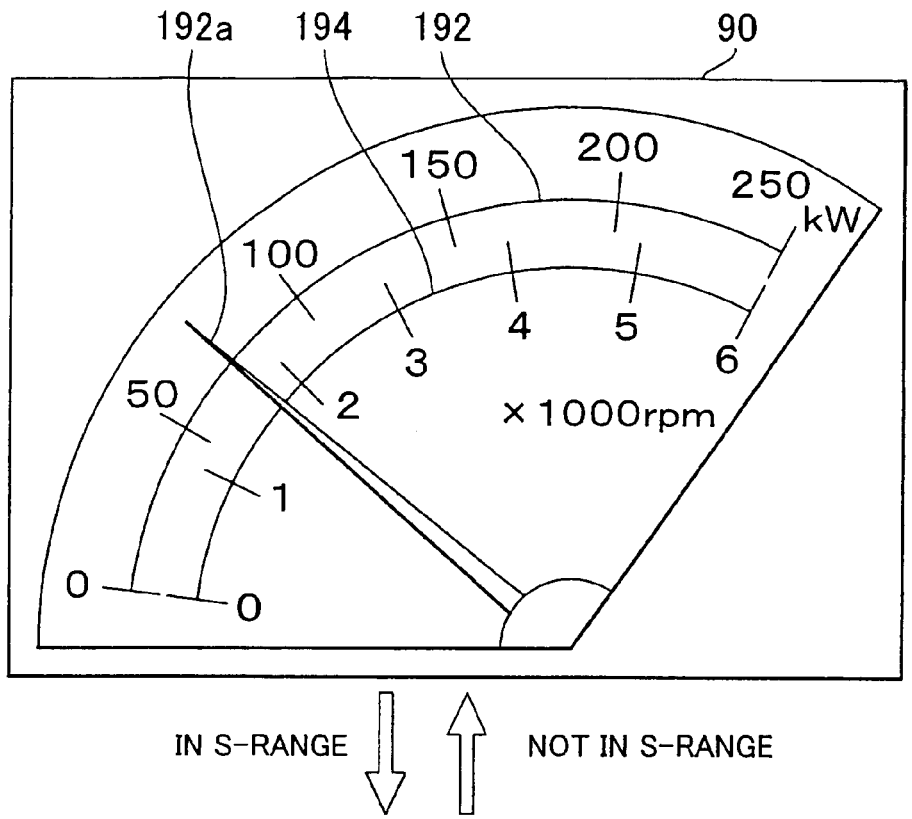
FIG. 8A is a power meter displayed in an other meter display panel.
Figure 8B:
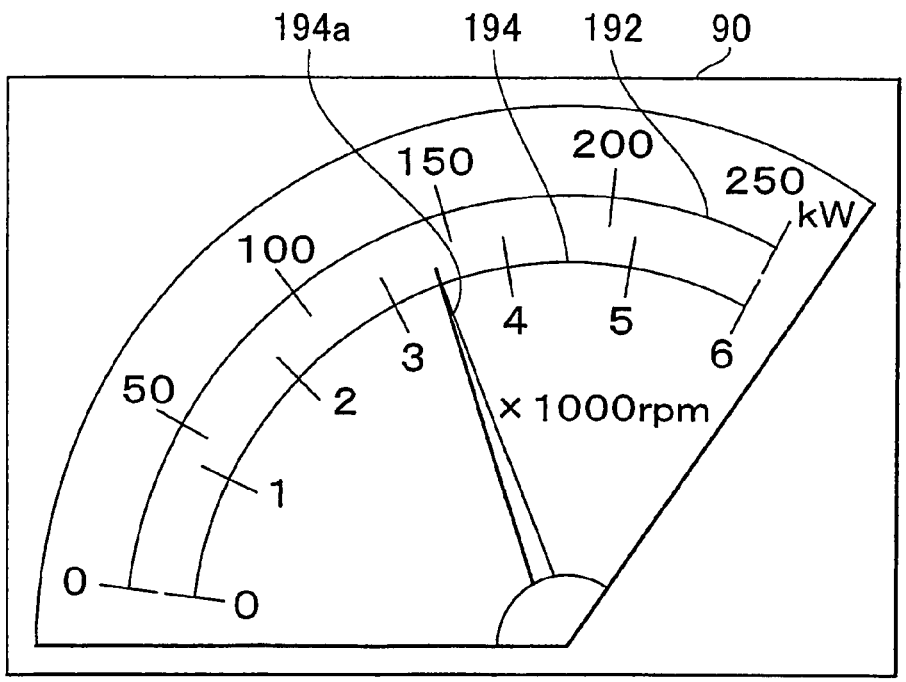
FIG. 8B is a tachometer displayed in the other meter display panel.

Moreover, in the foregoing embodiment, when the power meter 92 is switched to the tachometer 94 or the tachometer 94 is switched to the power meter 92 in the meter display panel 90, the meter ECU 96 electrically switches the meter scale of the power meter 92 and the meter scale of the tachometer 94 whilst utilizing the same needle for needles 92a and 94a. However, as shown in FIG. 8, the meter ECU 96 may electrically switch and display different needles, namely, a needle 192a and a needle 194a, whilst displaying both the meter scale of a power meter 192 and the meter scale of a tachometer 194 (i.e., constantly displaying both meter scales). In this figure, the meter scale of the power meter 192 is indicated along an outer arc, and the mater scale of the tachometer 194 is indicated along an inner arc. Therefore, the needle 192a of the power meter 192 is displayed such that its tip extends beyond the outer arc (see FIG. 8A). Further, the needle 194a of the tachometer 194 is displayed such its tip does not extend beyond the outer arc but extends beyond the inner arc (see FIG. 8B).

Furthermore, in the foregoing embodiment, the meter display panel 90 is a liquid crystal panel. The invention is not limited to this, however, and may use any configuration that enables various forms of information or data to be displayed. For example, a panel including an arrangement of many LEDs may be used.

Moreover, in the hybrid vehicle 20 of the foregoing embodiment, when the driver upshifts or downshifts when the shift lever 81 is in the S-range, the target engine speed Ne* of the engine 22 that is originally calculated is renewed to a lower value. Alternatively, however, the engine required power Pe* that is originally calculated may be renewed to a lower value. Then, the engine speed and the engine torque of the optimum operation point appropriate for the renewed engine required power Pe* may be regarded as the target engine speed Ne* and the target torque Te* for controlling the engine 22.

Also, in the hybrid vehicle 20 of the foregoing embodiment, the power that is output from the engine 22 is displayed in the power meter 92. Alternatively, however, a power Pr (or the drive required power Pr*) that is output to the ring gear shaft 32a serving as the drive shaft may be displayed.

Furthermore, in the meter display device of the foregoing embodiment, two meters, namely, the power meter 92 and the tachometer 94 are displayed at the same position in the display area. The invention is not limited to two meters, however. For example, in addition to the engine speed of the engine 22 and the output power of the engine 22, the required power of the engine 22 may be displayed. Moreover, information related to charging/discharging of the battery 50 and the amount of stored electric power may be displayed at the same position.

Figure 9:
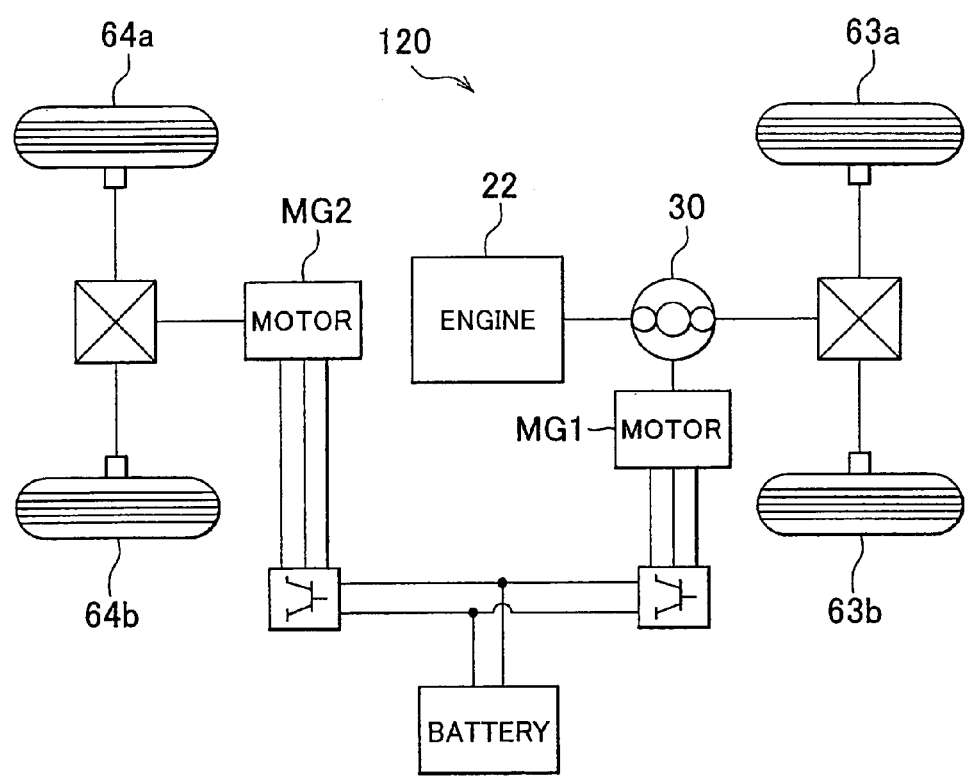
FIG. 9 is a block diagram schematically showing the structure of a hybrid vehicle.

Furthermore, in the hybrid vehicle 20 of the foregoing embodiment, the power of the motor MG2 is changed by the reduction gear 35 and output to the ring gear shaft 32a. Alternatively, however, as shown in a modified example of a hybrid vehicle 120 in FIG. 9, the power of the motor MG2 may be transmitted to a wheel shaft (the wheel shaft connected to wheels 64a, 64b in FIG. 9) that is different from the wheel shaft connected to the ring gear shaft 32a (the wheel shaft connected to the driven wheels 63a, 63b).

Figure 10:
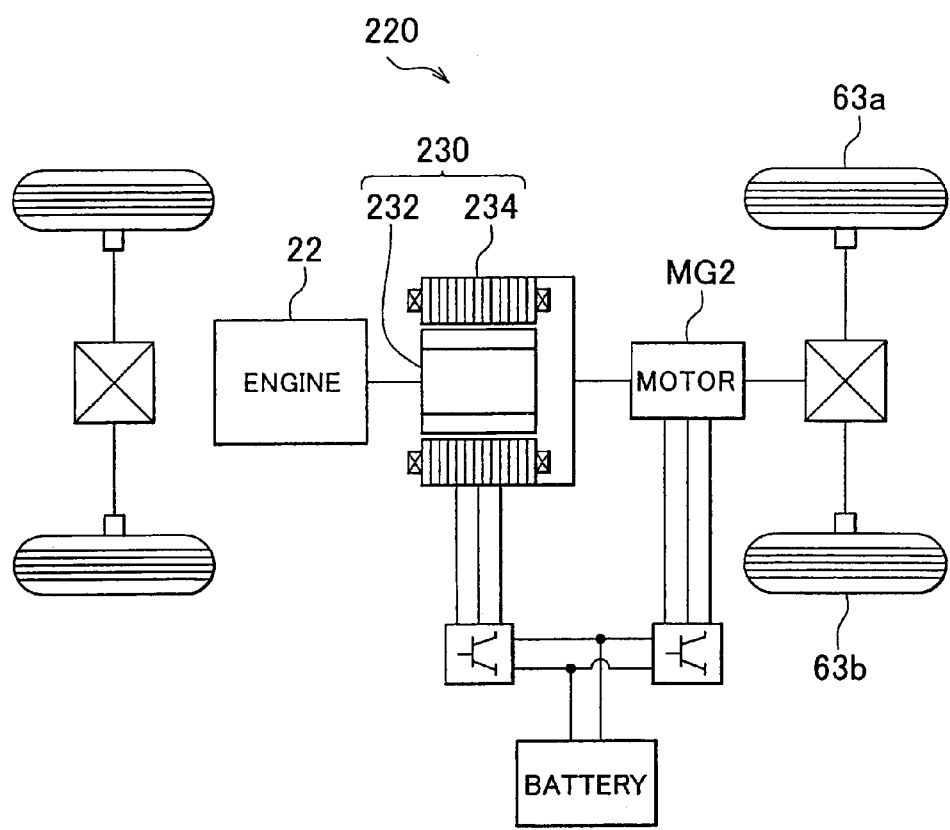
FIG. 10 is a block diagram schematically showing the structure of a hybrid vehicle.

Moreover, in the hybrid vehicle 20 of the forgoing embodiment, the power of the engine 22 is output to the ring gear shaft 32a that serves as the drive shaft and that is connected to the driven wheels 63a, 63b via the power distribution/integration mechanism 30. Alternatively, however, as shown in a modified example of a hybrid vehicle 220 in FIG. 10, the hybrid vehicle 220 may include a motor generator 230 having an inner rotor 232 that is connected to the crank shaft 26 of the engine 22, and an outer rotor 234 that is connected to the drive shaft which outputs power to the driven wheels 63a, 63b. The motor generator 230 transmits a part of power of the engine 22 to the drive shaft and converts the remaining power to electric power.

What is claimed is:

1. A meter display device used in a hybrid vehicle including an internal combustion engine and a motor that are controlled such that power from one and/or both of the engine and the motor is output to a drive shaft that rotates wheels, comprising:
   (a) a display device that displays a plurality of types of display information related to the hybrid vehicle at the same position on the display device, the display information including first display information and second display information that are different from each other; and
   (b) a display controller that controls the display information displayed on the display device such that any one of the plurality of types of display information that can be displayed on the display device is displayed, wherein
   (c) the display controller controls which one of the first and second display information is displayed on the display device based on whether a shift lever of the hybrid vehicle is in a sequential shift range, and wherein
   the first display information is a rotation speed of the internal combustion engine, and
   the second display information is any one of power that is output from the hybrid vehicle, power that is output from the internal combustion engine, or power that is output to the drive shaft.

2. The meter display device according to claims 1, wherein whether the shift lever is in the sequential shift range is indicated by a sequential shift switch;
   the display controller performs control such that the rotation speed meter is displayed on the display device when the sequential shift switch is on, and
   the display controller performs control such that the output meter is displayed on the display controller when the sequential shift switch is off.

3. The meter display device according to claim 1, wherein the display controller performs control such that the rotation speed meter is displayed on the display device when the hybrid vehicle is being operated such that the engine speed of the internal combustion engine is adjusted as if a gear ratio has been changed, and
   the display controller performs control such that the output meter is displayed on the display device when the hybrid vehicle is being operated such that the engine speed of the internal combustion engine is not adjusted as if a gear ratio has been changed.

4. The meter display device according to claim 1, wherein the display controller performs control such that the output meter is displayed on the display device when the internal combustion engine is stopped and power is output from the motor to the drive shaft.

5. The meter display device according to claim 1, wherein the display controller performs control such that, when switching between displaying the output meter and the rotation speed meter, the display controller electronically switches, at the least, a meter scale display of the output meter with a meter scale display of the rotation speed meter.

6. The meter display device according to claim 1, wherein the display controller performs control such that, when switching between displaying the output meter and the rotation speed meter, the display controller electronically switches, at the least, a needle display of the output meter with a needle display of the rotation speed meter.

7. A hybrid vehicle equipped with the meter display device according to claim 1.

8. The hybrid vehicle according to claim 7, further comprising:

an electric power/power input-output device, connected to an output shaft of the internal combustion engine and the drive shaft, that outputs at least a part of the power output from the internal combustion engine to the drive shaft by inputting/outputting electric power and power, and a vehicle control device that controls the internal combustion engine, the electric power/power input-output device and the motor based on the operation condition of the hybrid vehicle.

9. The hybrid vehicle according to claim 8, wherein the electric power/power input-output device includes a three-shaft power input/output device, having three shafts that are connected to three respective shafts that are the output shaft of the internal combustion engine, the drive shaft and a third rotating shaft, for selectively inputting/outputting power to/from any two of the three shafts, and selectively inputting/outputting power to/from the remaining shaft such that the two shafts input power when the remaining shaft outputs power or the two shafts output power when the remaining shaft inputs power; and a generator that inputs/outputs power to/from the third rotating shaft.

10. The hybrid vehicle according to claim 8, wherein the electric power/power input-output device comprises:

a first rotor which is connected to the output shaft of the internal combustion engine;

a second rotor which is connected to the drive shaft; and a rotor motor which inputs/outputs electric power generated by the electromagnetic effect of the first rotor and the second rotor, and which outputs at least a part of power from the internal combustion engine to the drive shaft.

11. A meter display method used in a hybrid vehicle including an internal combustion engine and a motor that are controlled such that power from one and/or both of the engine and the motor is output to a drive shaft that rotates wheels, comprising:

displaying first display information that shows changes in a first parameter related to the hybrid vehicle on a display device;

displaying second display information that shows changes in a second parameter related to the hybrid vehicle on the display device, instead of displaying changes in the first parameter, and controlling which one of the first and second display information is displayed based on whether a shift lever of the hybrid vehicle is in a sequential shift range, wherein the first display information is a rotation speed of the internal combustion engine, and the second display information is any one of power that is output from the hybrid vehicle, power that is output from the internal combustion engine, or power that is output to the drive shaft.

* * * * *

UNITED STATES PATENT AND TRADEMARK OFFICE
CERTIFICATE OF CORRECTION

PATENT NO.       : 7,710,252 B2
APPLICATION NO.  : 11/794949
DATED            : May 4, 2010
INVENTOR(S)      : Yasuhiro Kaya It is certified that error appears in the above-identified patent and that said Letters Patent is hereby corrected as shown below:

| Column | Line | |
|--------|------|---|
| 13 | 10 | Change "mater scale" to --meter scale--. |
| 14 | 30 | Change "claims 1" to --claim 1--. |

Signed and Sealed this
Twenty-second Day of February, 2011

David J. Kappos
*Director of the United States Patent and Trademark Office*